Oct. 30, 1945.　　　　G. G. HARRINGTON　　　　2,388,141
ELECTRICAL LOGGING APPARATUS
Filed Jan. 4, 1943　　　3 Sheets-Sheet 2
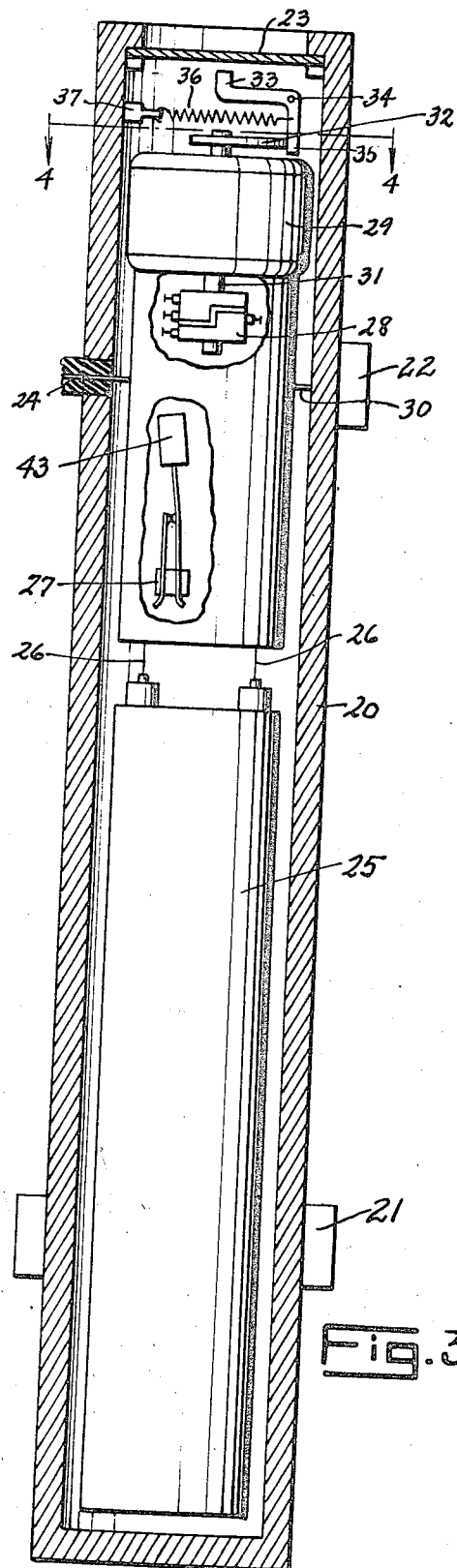
Fig.3.
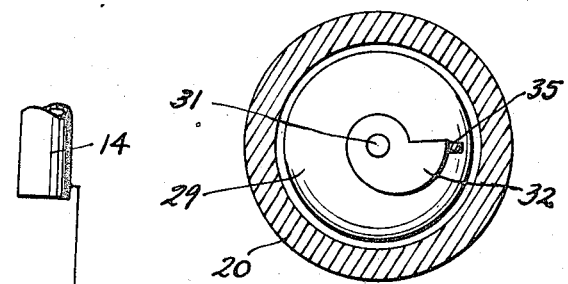
Fig.4.
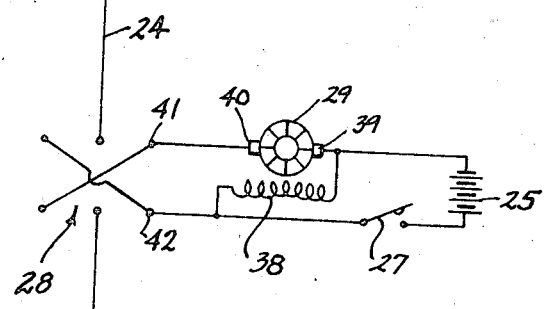
Fig.5.
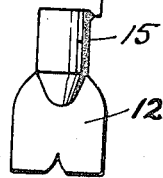
George G. Harrington.
INVENTOR.
BY J. Vincent Martin
and
Ralph R. Browning.
ATTORNEYS Patented Oct. 30, 1945

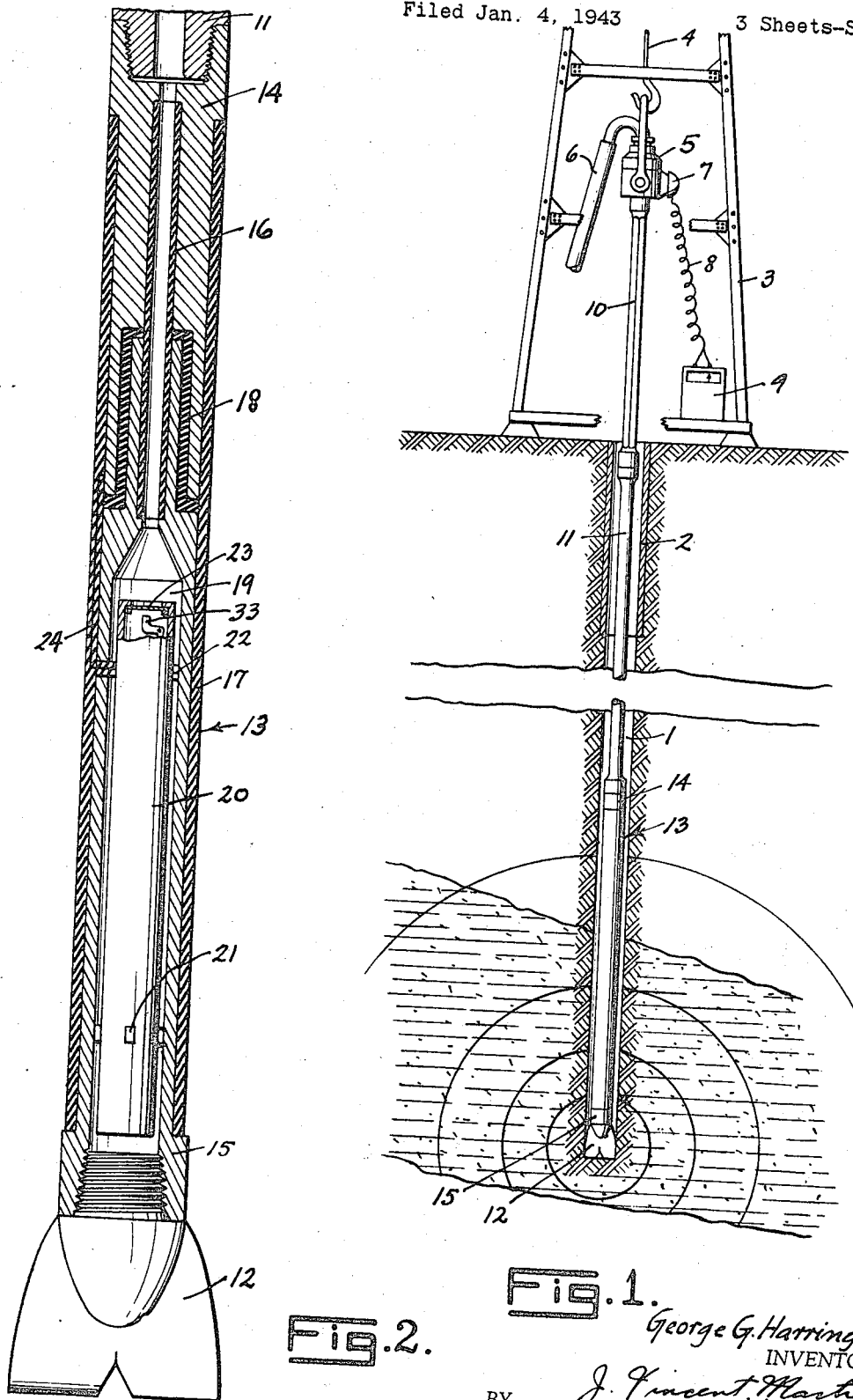

2,388,141

UNITED STATES PATENT OFFICE 2,388,141

ELECTRICAL LOGGING APPARATUS

George G. Harrington, Houston, Tex., assignor to Reed Roller Bit Company, Houston, Tex., a corporation of Texas Application January 4, 1943, Serial No. 471,258

4 Claims. (Cl. 255—1)

This invention relates in general to the logging of earth formations or the like and has for its general object the provision of a device which will make it possible to provide logs of bore holes in the earth without the necessity for electrical connections extending from the surface of the earth to the position where the nature of the formation is being logged.

It is the customary practice in providing electrical logs of the formations through which bore holes are drilled, to first drill the hole, then to remove the drilling equipment, and then lower into the bore hole on an electrical cable certain electrodes which are connected to the surface of the earth by electrical connections. Through measurements of the flow of current flowing between two electrodes the natural self potential of the formations surrounding the bore hole may be indicated, and through impressing upon two such electrodes an alternating current, the apparent specific impedance of the formations being logged may be indicated. It is also possible to secure other electrical characteristics of the formations surrounding the bore hole at the position where one of the electrodes may be located.

As above stated, it has been thought necessary in the prior art to provide an electrical conductor leading from the electrode or electrodes within the bore hole up to the surface of the ground. This is not only an expensive matter but also introduces great possibilities of trouble in operation and is for many practical reasons objectionable. This invention, therefore, has for one of its objects the elimination of the necessity for an electrical conductor from the electrodes within the bore hole being surveyed to the surface of the ground.

It is further noted that in connection with the prior usage in electrical logging of bore holes it was considered necessary first to drill the bore hole as deep as required, then to remove the drilling equipment, and then to electrically log the bore hole.

It is an object of this invention to provide a structure which will be capable of electrically logging a bore hole simultaneously with the drilling thereof, thereby eliminating not only the necessity of removing the drilling equipment and replacing it with the logging equipment, and thus effecting a great saving in time, but also providing a means whereby an operator may tell at all times the nature of the formation through which he is drilling instead of having to wait until the hole has been completed before obtaining this information. This not only enables an operator to cease drilling whenever a desirable formation is encountered if he wishes to do so, but it also enables him at all times to follow the drilling operations closely with a casing so that the risk of cave ins in a long section of open hole which has no casing will be eliminated.

Another object of this invention is to provide a means whereby information relating to the electrical and other characteristics of the formation surrounding the hole being drilled may be communicated to the surface of the ground without the necessity for electrical conductors or other special information transmitting means extending from the bottom to the top of the well other than that ordinarily used in drilling a well.

Other objects and advantages of this invention will become apparent from the following description taken in connection with the accompanying drawings wherein are set forth by way of example and illustration certain embodiments of the invention.

In the drawings:

Fig. 1 shows a longitudinal vertical section through a well being drilled with an apparatus constructed in accordance with this invention, in place therein.

Fig. 2 is a vertical cross section through the drill collar forming the lower portion of the drill stem illustrated in Fig. 1, this drill collar being specially constructed for the purpose of this invention.

Fig. 3 is a more detailed view of certain of the interior construction within the drill collar illustrated in Fig. 2, this figure constituting a longitudinal cross section through the inner casing within said drill collar, within which casing a portion of the apparatus constructed in accordance with this invention is located.

Fig. 4 shows a transverse cross section through the upper portion of Fig. 3 taken along the line 4—4 thereof.

Fig. 5 illustrates an electrical diagram for hooking up the apparatus illustrated in Fig. 3 in such a manner as to obtain an indication of the apparent specific impedance of a formation being drilled through.

Fig. 6 is a view similar to Fig. 3 but illustrating a slightly modified form of apparatus intended for indicating the natural self potential of a formation being drilled through.

Figure 6:
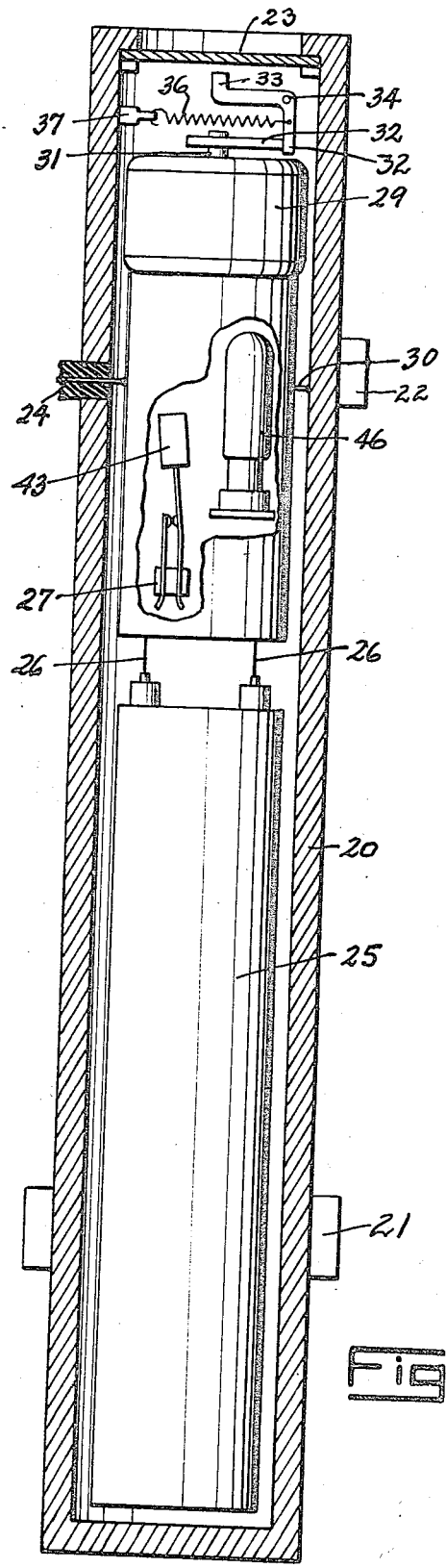

Referring now first to Fig. 1, there is illustrated a bore hole 1 which is in the process of being drilled. The upper portion of this bore hole has already been provided with a casing 2 which is set in the ordinary manner for the purpose of preventing the hole from caving in about the drill stem and for the purpose of shutting off extraneous fluids from the upper formations.

The numeral 3 illustrates the customary derrick construction forming a part of the usual well drilling equipment. From the upper end of this derrick is suspended in the usual manner by means of cables 4 or the like a swivel head 5. Connected to this swivel head is the usual hose 6 by which the drilling fluid is pumped through the swivel head and into the drill stem.

In accordance with this invention, a microphone 7 is secured to the swivel head or to some other convenient portion of the apparatus circulating the drilling fluid and connected to the drill stem, by which microphone it is possible to pick up vibrations from the drilling fluid and also from the drill stem. This microphone is connected by means of suitable wires 8 to a frequency meter 9, which is preferably of the recording type so that it will record frequency or variations in frequency of sounds picked up by the microphone 7. Preferably, the microphone 7 and also the frequency meter 9 have such characteristics that they will not respond to sounds of frequencies widely different from that at which the apparatus is adapted to operate in the manner hereinafter set forth.

Suspended from the swivel 5 is the usual drill stem consisting of the so-called Kelly joint 10 which is simply a squared section of tubular material through which the drill stem is rotated, the usual drill pipe 11, and the usual drill bit 12 connected to the lowermost section of drill pipe by means of a special drill collar 13.

Referring now more particularly to Fig. 2 in which the drill collar just referred to is illustrated more in detail, it will be seen that the drill collar comprises an upper section 14 of metallic material, which upper section is connected to the lower section 15 of similar material by means of an inner tubular insulating member 16 and an outer tubular insulating member 17. The sections 14 and 15 are also insulated from each other by means of suitably formed insulating material 18.

Within the lowermost section 15 there is provided a chamber 19 adapted to receive the housing 20 within which a considerable portion of the apparatus provided by this invention is enclosed. This cylindrical member 20 is preferably spaced from the walls of the member 15 by suitable spacing elements 21 and 22, and may be supported in its place either by these spacing elements or by any other suitable means. The upper end of this cylindrical member is preferably closed by means of a diaphragm 23 the purpose of which will be presently set forth. It will be appreciated, however, that this diaphragm 23 may be located elsewhere than in the upper end portion of the housing 20.

It is further to be noted that there is an electrical conductor 24 extending from the housing 20 up through the insulation 17 and electrically connected to the upper member 14. The housing is electrically in contact with the lower member 15, which member also of course is in electrical contact with the drilling bit 12.

With reference to Fig. 3 which illustrates the housing 20 in enlarged form and in vertical cross section, it will be seen that this housing contains adjacent its lower end a battery 25 or other source of suitable electric power, and that this battery is connected by means of conductors 26 through the centrifugally operated switch 27 to a reversing commutator 28, a motor 29, the insulated conductor 24, and the grounded conductor 30. The reversing commutator 28 is mounted on the shaft 31 of the motor 29, and on the opposite end of this shaft is carried a cam 32. A hammer 33 is pivotally mounted at 34 within the housing and has its actuating lever end 35 held in engagement with the cam 32 at all times by means of a spring 36. This spring 36 is anchored at 37 within the housing as indicated. The cam and hammer are so proportioned that when the cam is turned to the point that allows the hammer to move toward the diaphragm 23 to the greatest extent, this hammer will contact the diaphragm and cause the diaphragm to vibrate. Thus, as the motor rotates the hammer will be successively lifted away from the diaphragm and allowed to drop back toward the diaphragm so as to strike the same and produce vibration thereof.

In Fig. 5 the electrical connections of the apparatus described in connection with Fig. 3 are illustrated. It will be seen that the battery 25 is connected through the switch 27 to the field 38 of the motor 29, that one side of the battery 25 is also connected to one of the brushes 39 of the motor 29, while the other brush 40 of said motor and the other pole of the battery 25 are connected to two of the terminals 41 and 42 respectively of the reversing commutator 28. The electrical conductors 24 and 30 respectively are connected to the other poles of the reversing commutator and serve to electrically connect these other poles to the upper portion 14 of the drill collar and to the lower portion 15 of the drill collar and the bit 12.

It will be seen that when the motor 29 is started as by the closing of the switch 27, the current going to the armature of the said motor will pass through the reversing commutator 28. As the motor rotates and this commutator rotates with the motor, the current going to the motor will pass through the conductors 24 and 30 to the upper and lower sections of the drill collar 14 and 15 respectively. These sections of the drill collar being insulated from each other will serve as electrodes, and the current flowing between them must of necessity flow through the formation and the drilling fluid. In the operation of the commutator while the motor rotates, the direction of this current through the formation will be alternately first in one direction and then in the other, thus providing a flow of alternating current through the formation, but at the same time supplying a direct current to the armature of the motor 29.

Inasmuch as alternating current is being forced through the formation between the electrodes formed by the members 14 and 15, the value of such current will vary depending upon the apparent specific impedance of the formation. As the value of the current varies, the speed of the motor 29 will also vary in the same proportion. As the speed of the motor 29 varies, the speed of the cam 32 will also vary and hence the frequency with which the hammer 33 is caused to strike the diaphragm 23 will be varied and this variation will be in direct proportion to the variation in the apparent specific impedance of the formation being drilled.

It will be readily apparent that the striking of the hammer 33 against the diaphragm 23 will cause the diaphragm 23 to vibrate and produce sounds that will be transmitted upwardly both through the drilling fluid and through the metal of the drill stem. These sounds will have a pitch adapted to be received by the microphone 7 and recorded by the frequency meter 9. Thus, the frequency meter 9 will produce at the surface of the ground at any and all times desired while the drilling equipment is in the hole, a record showing the variations in the apparent specific impedance of the formation. No electrical connections between the equipment at the surface of the ground and that located in the bore hole are necessary.

It will be understood that the operation of the switch 27 may be such that it will be controlled by any factor that can be controlled from the surface of the ground. In the particular instance illustrated the switch is made up of two arms, one of which is of resilient material and has a normal position such that the switch is open. This arm however is weighted and is so disposed that the weight, indicated by the numeral 43, will be thrown outwardly by centrifugal force to close the switch. Thus, the switch 27 will be closed at all times during the operation of the drill and thus a continuous record of the apparent specific impedance of the formation being drilled will be provided. The switch could of course be arranged in a well known manner so that it would be closed when the drill is not operating instead of while the drill is operating. All this will be readily apparent to a person skilled in the art.

Figure 7:
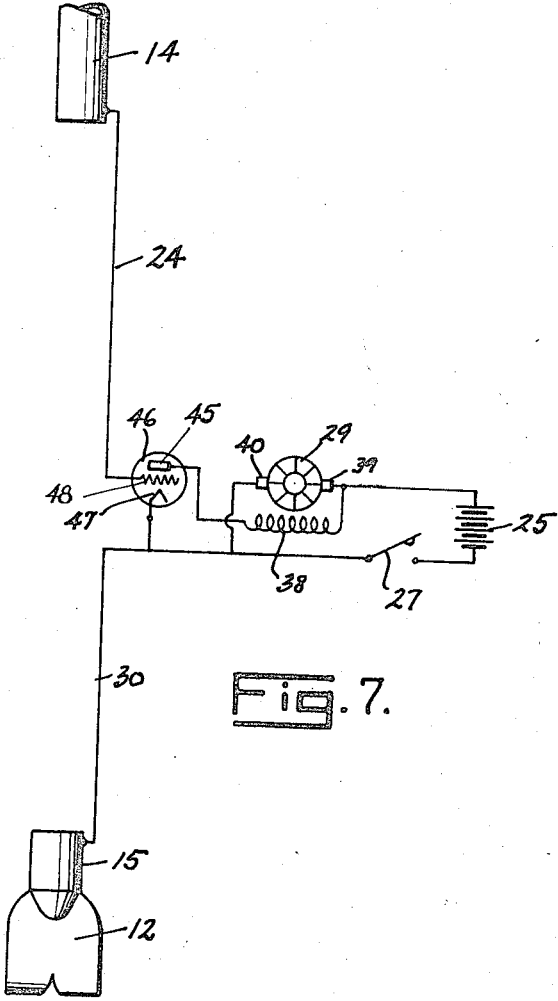
Fig. 7 shows an electrical diagram for the apparatus illustrated in Fig. 6.

Referring now more particularly to Figs. 6 and 7, there is illustrated in Fig. 6 within the housing 20 an apparatus whereby variations in the natural self potential of the formation are intended to be determined. This apparatus consists in general of the battery which again is denoted by the numeral 25, the switch 27, the conductors 26 for connecting the battery 25 to the other apparatus, the motor 29, the cam 32, and the hammer 33. All these have substantially the same function as was indicated in connection with the description of Fig. 3. Likewise, the said conductors 24 and 30 are provided for connection respectively to the upper portion 14 of the drill collar and to the lower portion 15 thereof, these portions serving as electrodes.

In addition to the other equipment there is employed in this instance a three element vacuum tube 46.

The apparatus just referred to, which incidentally does not include the reversing commutator 28, is hooked up as illustrated in Fig. 7. In this instance, the battery 25 is connected through the switch 27 directly to the brushes 39 and 40 on the armature of the motor 29. The field of this motor is connected to one terminal of the battery and to the plate 45 of the tube 46. The other terminal of the battery is connected to the filament 47 of this tube and also to the conductor 30 which leads to the lower end of the drill stem and connects to the element 15. The grid 48 of the tube 46 is connected to the conductor 24 and thence to the upper end of the drill collar which forms the electrode 14.

It will be seen that when the switch 27 is closed, full voltage of the battery 25 will be thrown across the motor 29 and the field of this motor will be excited by the current which flows to the plate 45 of the tube 46. The amount of current which can flow from the filament 47 to the plate 45 and hence the amount of current by which the field 38 is excited is controlled by the potential of the grid 48. The potential of this grid 48 will vary as the natural self potential of the formation varies. Hence, the speed of the motor 29 will be varied by variations in the excitation of the field 38 and this excitation will be in proportion to the natural self potential of the formation. Thus, just as in the previous case, variations in this electrical characteristic of the formation will be reflected in variations in the frequency of the striking of the hammer 33 against the diaphragm 23, and these variations will be recorded by means of the frequency meter 9 at the surface of the ground.

It will be appreciated that various other characteristics of the formation may be recorded at the surface of the ground in the same manner. It is noted, however, that this invention does not have to do with the details of the means whereby the characteristics of the formation are translated into electrical variations. Rather, this invention has to do with the translation of the varying characteristics of the formation into variations in mechanical impulses or disturbances and with the pick up of these mechanical impulses or disturbances at the surface of the ground so that a record may be made at the surface of the ground of the variations in the various characteristics in the formation without the necessity for having any electrical connections between the surface of the ground and the point where the measurements are being taken.

A device has thus been provided which is capable of carrying out all of the objects and advantages sought by this invention.

Having described my invention, I claim:

1. In a well drilling apparatus, a drill stem, a drill bit, a drill collar having a drill stem connecting portion and a drill bit connecting portion electrically insulated from each other, and having a chamber therein communicating with the interior of the drill stem, a housing supported in said chamber and having a diaphragm positioned for exposure to fluid in said chamber, means in said housing for vibrating said diaphragm, said vibrating means comprising a diaphragm striker, a variable speed electric motor for periodically displacing said striker, a source of motor actuating electric power, and a circuit including said motor, said source of electric power, and means for completing said circuit through the formation surrounding said drill collar, to control the magnitude of current flowing through the circuit and thereby the speed of the motor in accordance with the electrical characteristics of the formation.

2. In a well drilling apparatus, a drill stem, a drill bit, a drill collar having a drill stem connecting portion and a drill bit connecting portion electrically insulated from each other, and having a chamber therein communicating with the interior of the drill stem, a housing supported in said chamber and having a diaphragm positioned for exposure to fluid in said chamber, means in said housing for vibrating said diaphragm, said means including a variable speed electric motor having stator and rotor windings, a source of electric power, and a circuit including said source of power and windings and connecting said source of power directly with one of said windings, and including means for completing the circuit through the other winding through the formation surrounding said drill collar to control the magnitude of current flowing through the circuit and thereby the speed of the motor in accordance with the electrical characteristics of the formation.

3. In a well drilling apparatus, a drill stem, a drill bit, a drill collar having a drill stem connecting portion and a drill bit connecting portion electrically insulated from each other, and having a chamber therein communicating with the interior of the drill stem, a housing supported in said chamber and having a diaphragm positioned for exposure to fluid in said chamber, means in said housing for vibrating said diaphragm, said vibrating means comprising a diaphragm striker, a variable speed electric motor for periodically displacing said striker, a source of motor actuating electric power, and a circuit including said motor, said source of electric power, and means for completing said circuit through the formation surrounding said drill collar to control the magnitude of current flowing through the circuit and thereby the speed of the motor in accordance with the electrical characteristics of the formation, said circuit completing means including a periodically actuated reversing switch driven by said motor for causing current to flow alternately in opposite directions through said formation.

4. In a well drilling apparatus, a drill stem, a drill bit, a drill collar having a drill stem connecting portion and a drill bit connecting portion electrically insulated from each other, and having a chamber therein communicating with the interior of the drill stem, a housing supported in said chamber and having a diaphragm positioned for exposure to fluid in said chamber, means in said housing for vibrating said diaphragm, said vibrating means comprising a diaphragm striker, a variable speed electric motor for periodically displacing said striker, a source of motor actuating electric power, and a circuit including said motor, said source of electric power, and means for completing said circuit through the formation surrounding said drill collar to control the magnitude of current flowing through the circuit and thereby the speed of the motor in accordance with the electrical characteristics of the formation, and a switch, displaceable by centrifugal force produced by rotation of the drill collar in drilling, interposed in said circuit.

GEORGE G. HARRINGTON.